United States Patent Office 3,744,987
Patented July 10, 1973

3,744,987
COATING METHOD OF FERTILIZER
Yoshihiko Omura and Eizaburo Watanabe, Yokohama, Japan, assignors to Showa Denko Kabushiki Kaisha, Tokyo, Japan
No Drawing. Continuation-in-part of abandoned application Ser. No. 705,272, Feb. 14, 1968. This application Oct. 21, 1970, Ser. No. 82,481
Claims priority, application Japan, Feb. 20, 1967, 42/10,470
Int. Cl. C05g 3/04
U.S. Cl. 71—64 F                         7 Claims

ABSTRACT OF THE DISCLOSURE

A coated granular fertilizer is manufactured by coating a solid fertilizer with a coating preparation which comprises a water-soluble resol type phenol resin having water tolerance of one or greater, an organic acid having a dissociation constant not exceeding $2 \times 10^{-4}$ and a filler such as talc and then harden the coating composition by heating at 100–130° C.

REFERENCE TO RELATED APPLICATION

This is a continuation-in-part of our copending application Ser. No. 705,272, filed Feb. 14, 1968, and now abandoned.

BACKGROUND OF THE INVENTION

This invention relates to a coated granular fertilizer and a manufacturing method therefor.

Recently, increasing attention is being given to coated fertilizers prepared by coating the surface of fertilizer grains with, for example, synthetic resin so as to restrict the dissolution of the fertilizer and ensure controlled release of its fertilizing components.

However, the resins heretfore known as usuable for the coating of fertilizer have many drawbacks. For example, they require the use of expensive solvents and, therefore, tend to increase the production cost; they involve a highly complicated coatitng procedure; and the surface of fertilizer particles to be coated therewith is vulnerable to cracking.

A main object of the present invention is to provide a fertilizer coating method which makes it possible to easily control the release of the fertilizing components.

Another object of this invention is to provide an inexpensive, uniformly coated fertilizer.

Still another object of this invention is to provide a coated fertilizer which has superior water resistance and which is not vulnerable to cracking even after being in the soil for a long time.

SUMMARY OF THE INVENTION

In the coating preparation of the present invention the viscosity of a water-soluble resol type phenol resin is raised and the formation in the product of fine pores of appropriate size is ensured by the addition of a filler such as talc, silica powder, white carbon or wheat flour which does not react with said resin. To hasten the harding of the resin there is further added as a catalyst an organic acid such as acetic acid or oxalic acid whose dissociation constant does not exceed $2 \times 10^{-4}$.

Phenol resins can be roughly classified into the resol type and the novolak type in accordance with the ratio of formalin to phenol, kinds of catalyst, etc. used.

Phenol resin used in the present invention is condensed water-soluble resol type phenol resin having a water tolerance of one or greater which is produced by reacting 100 parts of phenol and 130–300 parts of formalin in the presence of caustic soda as a catalyst. Not only can this resin be used, as it is without being dissolved in an organic solvent but it is also low in cost and very safe from fire and explosion. Where instead of the aforementioned phenol resin, vinyl acetate resin or urea resin is used, there are likely to occur cracks which allow the fertilizer to dissolve quickly thus making controlled release impossible.

However the phenol resin used in the present invention lacks viscosity and when it is used alone for coating the fertilizer, the greater part thereof seeps into the fertilizer. Therefore, a sufficient coating is not formed. So as to increase the viscosity of the resin and thereby ensure the formation of fine pores of appropriate size in the coating of the product, there is added to the resin a filler such as talc, wheat flour, silica powder or white carbon which does not react with the resin. When the fertilizer thus coated is put in the soil, water contained in the soil gradually enters the fertilizer from the innumerable pores formed in the coating thereby dissolving the fertilizing components which gradually pass into the soil.

With a view to determining how the ratio of filler to resin affects the rate at which the fertilizing components dissolve and flow out of the fertilizer, talc was added at different ratios between 0.5 and 30 parts to 10 parts of water-soluble phenol to produce five coating preparations. Each of the said preparations was used to twice coat the surface of a solid fertilizer (egg-shaped, 40 g. each) by the brush coating method, and the solid fertilizer was heated at 120° C. for 60 minutes to allow the coating to harden. Each sampling thus obtained was wrapped in cotton gauze, placed on a metal support, submerged in a beaker filled with 1 l. of distilled water and allowed to stand. A 5-ml. sampling was taken every other day over one week from the liquid held in each beaker and the rate of release was calculated on the basis of the weight of the dried fertilizing components contained therein.

The results of this experiment are shown in Table 1.

TABLE 1

| Parts of talc to 10 parts phenol resin | Release rate (percent) after— | | | |
|---|---|---|---|---|
| | 1 day | 3 days | 5 days | 7 days |
| 0.5 | 19.9 | 40.5 | 60.5 | 64.7 |
| 1.0 | 19.5 | 43.3 | 62.6 | 68.6 |
| 2.0 | 19.4 | 39.0 | 56.6 | 62.0 |
| 3.0 | 19.3 | 43.6 | 61.0 | 68.0 |
| 4.0 | 19.3 | 46.6 | 70.0 | 74.7 |
| 10.0 | 19.4 | 46.8 | 52.7 | 65.3 |
| 15.0 | 18.6 | 39.2 | 58.2 | 62.5 |
| 20.0 | 18.7 | 45.2 | 60.5 | 71.2 |
| 25.0 | 19.2 | 42.3 | 63.8 | 68.6 |
| 30.0 | As the coating preparation becomes a paste, coating cannot be effected | | | |

From the preceding table, it is evident that even if the filler is added at a high ratio, there is seen almost no change in percentage released and the coating preparation is therefore effective. However, if 30 parts filler are added, the coating preparation fails to form a coating on the fertilizer and is therefore unusable.

Although water-soluble phenol resin will harden in a shorter time if heated under pressure, the application of pressure is undesirable in the case of fertilizer coating. As, however, it is important from an industrial point of view to shorten the hardening time, the present inventors conducted experiments to find a catalyst appropriate for speeding up the hardening process. Experiments were conducted using, as catalysts, such inorganic acids as hydrochloric acid, sulfuric acid, nitric acid and phosphoric acid and such organic acids as formic acid, acetic acid, butyric acid and oxalic acid. All acids except formic acid, acetic acid and butyric acid were found to have the following drawback: They showed such strong catalytic action that the resin was hardened in a matter of a few seconds at room temperature, making the coating operation extremely difficult. Moreover, the coating formed consequently repelled water, underwent shrinkage and lacked water-resistance.

By contrast, when formic acid, acetic acid or butyric acid was used as a catalyst, the hardening reaction proceeded only very slightly at normal room temperature and the resin did not separate from water. Perfect hardening of the coating was achieved by heating.

The coating formed on the surface of fertilizer in the presence of such catalyst enjoys a fair degree of flexibility and abounds in water-resistance.

Of the various organic acids, oxalic acid exhibits different properties from those of formic acid, acetic acid and butyric acid as mentioned above. After conducting a study, it was clear that the difference is related to the dissociation constant of such acids. That is to say, formic acid (HCOOH) has a dissociation constant of $2 \times 10^{-4}$, acetic acid ($CH_3COOH$) $19 \times 10^{-5}$, butyric acid ($CH_3(CH_2)_2COOH$) $1.5 \times 10^{-5}$ and oxalic acid ($(COOH)_2$) $4 \times 10^{-2}$. When representative acids having a dissociation constant below $4 \times 10^{-2}$, such as acrylic acid, crotonic acid, iso-crotonic acid, succinic acid, glycolic acid, lactic acid and so forth were subjected to the same test as performed on acetic acid, they showed a similar trend. In consideration of the ready availability and inexpensiveness, however, acetic acid is preferable industrially.

Now, an explanation is made of the quantity of such organic acid to be added, as a catalyst, to the water-soluble phenol resin.

To the mixture having 2 parts of talc incorporated into 10 parts of water-soluble phenol resin, acetic acid was added at the different ratios of from 0% to 6% of the phenol resin to produce three coating preparations.

These preparations were deposited in three different ways: (a) one coating by dipping method, (b) two coatings by dipping method and (c) one coating by the brush method. The hardening was carried out by heating at 130° C. for 30 minutes.

The rate of release was determined by the same method as used for the experiment of Table 1.

The rates of release determined for the coated fertilizer samples after being left to stand for one week are shown in Table 2.

TABLE 2

| Sample | Thickness of coating (μ) | Ratio of added acetic acid to phenol resin (wt. percent) | | | | | |
|---|---|---|---|---|---|---|---|
| | | 0 | 0.2 | 0.5 | 2 | 4 | 6 |
| (a) | 110 | 100 | 92.7 | 82.5 | 76.7 | 81.1 | 84.3 |
| (b) | 150 | 100 | 75.5 | 33.7 | 32.9 | 35.6 | 51.8 |
| (c) | 100 | 100 | 100 | 73.8 | 73.2 | 74.6 | 80.9 |

Table 2 indicates that the rate of release of the fertilizer varies with the percentage of acetic acid added. In the sample wherein no acetic acid was used, the hardening was insufficient and all fertilizer dissolved. In case of 0.2% acetic acid, almost no hardening was effected.

As can be seen from the above table, the best controlled release characteristics are obtained with percentages of acetic acid ranging from 0.5 to 6 wt. percent.

As explained above, there is a relationship between the amount of catalyst added and the hardening time. It is natural that the higher the amount of the added catalyst, the shorter the hardening time. The amount of the added catalyst, therefore, may be selected in accordance with the purpose of use.

A description is given hereinafter of the relationship between the hardening temperature of coating preparation and the release rate for fertilizer.

The coating preparation made of 10 parts of water-soluble phenol resin, 2 parts of talc and 0.2 part of acetic acid was spread twice with a writing brush on egg-shaped solid fertilizer samples (each weighting 40 g.), which were thereafter heated at the different temperatures of 100° C., 110° C., 120° C. and 130° C. for 60 minutes. By following the procedure of the experiment of Table 1, the release rate for fertilizing component was determined of each coated fertilizer sample. The thickness of the coating formed was 200μ.

TABLE 3

| Temperature, °C. | Release rate (percent) after— | | | | |
|---|---|---|---|---|---|
| | 2 days | 7 days | 16 days | 26 days | 30 days |
| 100 | 1.2 | 5.2 | 20.5 | 43.3 | 50.1 |
| 110 | 0.6 | 3.4 | 4.5 | 16.8 | 20.7 |
| 120 | 0.5 | 0.9 | 1.9 | 3.3 | 5.1 |
| 130 | 0.3 | 0.8 | 1.9 | 2.9 | 4.3 |

The preceding table shows that, in the range of hardening temperatures of 100° C. to 130° C., the coating acquired an increased degree of hardening and gave enhanced restriction of release in proportion to the rise of temperature. Although the highest temperature used in this experiment was 130° C., the degree of hardening may be heightened further at higher temperatures such as more than 140° C. in view of the boiling point of the organic acid to be used.

As mentioned hitherto, the coating of the fertilizer is carried out by a dipping method, a brush coating method, etc., but it may be effected by the following method. At the first step, the fertilizer is put in a rotating drum. Then, a proper amount of the coating preparation is added drop by drop to the drum as it rotates. When the preparation has stuck to the whole surface of the fertilizer, heat is applied thereto.

DESCRIPTION OF PREFERRED EMBODIMENTS

The following examples are further illustrative of this invention, and it will be understood that the invention is not limited thereto.

Example 1

A mixture consisting of 10 parts water soluble phenol resin, 2 parts talc and 0.2 part acetic acid was spread evenly over the surface of solid fertilizer (egg-shaped: 40 g. each) by the brush coat method. This coating was solidified at 120° C. for 60 minutes to form a film. Two samples, (A) and (B), were selected and their rates of release were measured. The results are given below:

TABLE 4

| Days | 1 | 3 | 4 | 5 | 7 | 8 | 11 | 14 | 18 | 24 | 27 | 31 |
|---|---|---|---|---|---|---|---|---|---|---|---|---|
| Sample: | | | | | | | | | | | | |
| (A), percent | 1.1 | 14.7 | 19.8 | 27.9 | 37.3 | 42.5 | 52.1 | 57.7 | 65.1 | 70.2 | 74.6 | 80.9 |
| (B), percent | 0.8 | 16.8 | 18.9 | 23.6 | 31.2 | 35.9 | 45.6 | 52.7 | 57.9 | 64.3 | 68.4 | 74.5 |

Example 2

By the method of Example 1, solid fertilizer was coated twice. The release rates for fertilizer treated in this manner were compared with respect to the rate of release with other types of samples. The results are shown in Table 5.

Test material—

(A) _____ Non-coated solid fertilizer.
(B) _____ Solid fertilizer coated by the method of this example.
(C) _____ Solid fertilizer coated with the same mixture as used in this example but with the talc replaced by the same volume of wheat flour.

TABLE 5

| Days | 1 | 2 | 7 | 17 | 21 | 28 |
|---|---|---|---|---|---|---|
| Sample: | | | | | | |
| (A), percent | 58.6 | 73.2 | 97.2 | 100 | | |
| (B), percent | 1.1 | 1.9 | 2.4 | 3.3 | 3.5 | 10.2 |
| (C), percent | 1.9 | 2.1 | 8.4 | 11.6 | 20.0 | 24.4 |

Example 3

Three coating prepartions were obtained by respectively adding 0.2 part formic acid, 0.2 part butyric acid and 0.2 part lactic acid to a mixture of 10 parts water-soluble phenol resin and 2 parts talc. Each coating preparation thus prepared was used to twice coat the surface of soild egg-shaped fertilizer and then hardened by heating at 120° C. for 60 minutes. The results are shown in Table 6.

Test material—

(A) ............... Sample in which formic acid was added.
(B) ............... Sample in which butyric acid was added.
(C) ............... Sample in which lactic acid was added.

TABLE 6

| Days | 2 | 6 | 7 | 16 | 26 | 30 |
|---|---|---|---|---|---|---|
| Sample: | | | | | | |
| (A), percent | 1.4 | 1.8 | 2.8 | 14.4 | 33.1 | 40.0 |
| (B), percent | 0.7 | 7.8 | 9.9 | 39.5 | 65.6 | 69.9 |
| (C), percent | 0.7 | 9.4 | 14.6 | 57.5 | 81.2 | 83.4 |

Example 4

5 kg. of a high analysis compound fertilizer (N: 12.4%, $P_2O_5$: 12.3%, $K_2O$: 12.5%, diameter of particle: 4-6 mm.) was put in a coating drum of the inclination type. Then, 200 g., 400 g. and 600 g. of coating preparation comprising 10 parts water-soluble resol type phenol resin, 0.2 part acetic acid and 20 parts talc were respectively sprayed onto the fertilizer while rotating the coating drum at 30 r.p.m. After coating, the coating, prepartion was hardened at 120° C. for 60 minutes. A release test was conducted as to the products obtained according to this example. The results was shown in the following table.

TABLE 7

| Amount of coating (percent) | Release rate (percent) after— | | | | |
|---|---|---|---|---|---|
| | 1 day | 7 days | 14 days | 21 days | 24 days |
| 4 | 42.5 | 63.3 | 74.5 | 86.2 | 98.5 |
| 8 | 22.4 | 35.3 | 52.1 | 75.2 | 83.3 |
| 12 | 5.2 | 11.3 | 25.8 | 42.2 | 56.1 |

Analysis method: 15 g. of the sample were put into a 500 ml. Erlenmeyer flask. 300 ml. of water having a temperature of 30° C. was added to the sample and the sample was then left in a constant temperature bath at a temperature of 30° C. Ammonium nitrate was analyzed and the release rate was obtained in accordance with the following equation.

$$\text{Rate of release} = \frac{\text{ammonium nitrate of dissolved solution}}{\text{ammonium nitrate of fertilizer}} \times 100$$

What is claimed is:
1. A coated granular fertilizer comprising
   a granular fertilizer,
   a hardened coating on the surface of said granular fertilizer and having a plurality of fine pores in the coating,
   said coating comprising a hardened mixture of:
      10 parts water-soluble phenol resin having a water tolerance of one or greater, 0.05 to .6 part of at least one organic acid having a dissociation constant not exceeding $2 \times 10^{-4}$ and 0.5 to 25 parts of filler.
2. The coated granular fertilizer, as set forth in claim 1 wherein the organic acid is one selected from the group of formic acid, acetic acid and butyric acid.
3. A method for coating fertilizer comprising the steps of applying to solid fertilizer particles a coating preparation comprising a water-soluble phenol resin having a water tolerance of one or greater, an organic acid having a dissociation constant not exceeding $2 \times 10^{-4}$ and a filler and then solidifying said coating preparation by heating it to a temperature betwen 100° C. and 130° C.
4. The method, as set forth in claim 3, wherein the organic acid is one selected from the group of formic acid, acetic acid and butyric acid.
5. The method, as set forth in claim 4, wherein about 0.05-0.6 part organic acid is added to 10 parts resin.
6. The method, as set forth in claim 3, wherein 0.5-25 parts filler is added to 10 parts resin.
7. The coated fertilizer, as set forth in claim 1, wherein said resin is a resol type pheno-formaldehyde resin.

References Cited
UNITED STATES PATENTS

| 3,223,518 | 12/1965 | Hansen | 71—64 |
| 2,411,557 | 11/1946 | Schuh | 260—59 |
| 2,665,221 | 1/1954 | Grandgaard | 117—161 X |
| 2,734,002 | 2/1956 | Schoeld et al. | 117—100 |
| 2,870,039 | 1/1959 | McReynolds | 117—100 X |
| 2,967,789 | 1/1961 | Hoyt | 117—100 |
| 2,992,124 | 7/1961 | Campbell | 117—161 |
| 3,083,118 | 3/1963 | Bridgeford | 117—100 X |
| 3,325,276 | 6/1967 | Feller | 71—64 |
| 3,369,884 | 2/1968 | Barton | 71—64 X |

FOREIGN PATENTS

| 1,087,009 | 10/1967 | Great Britain | 117—161 |

WILLIAM D. MARTIN Primary Examiner
D. C. KONOPACKI, Assistant Examiner

U.S. Cl. X.R.

117—100 A, B, 161 L